D. I. COOKE.
CAR VENTILATING SYSTEM.
APPLICATION FILED OCT. 19, 1909.
1,024,438.
Patented Apr. 23, 1912.
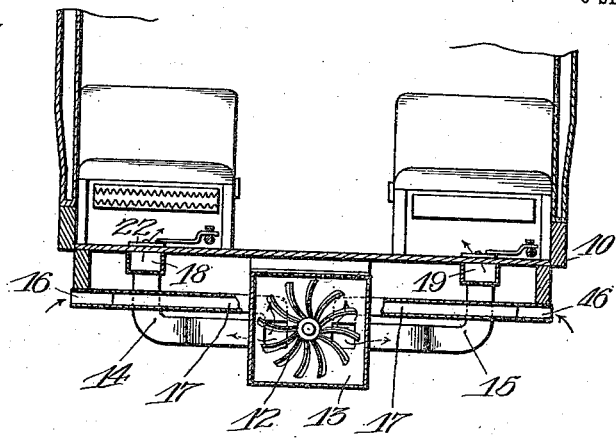
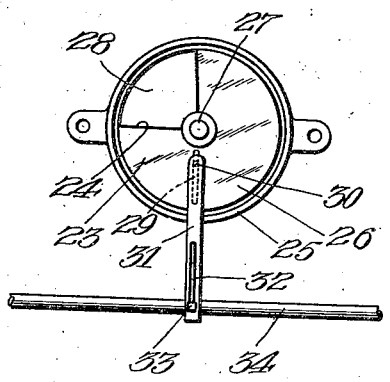
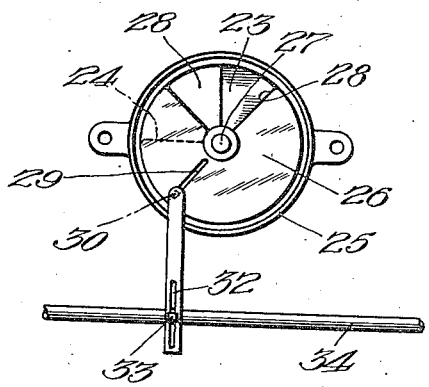
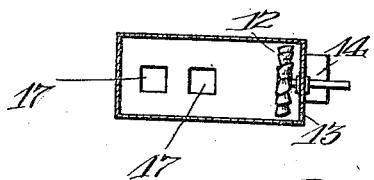

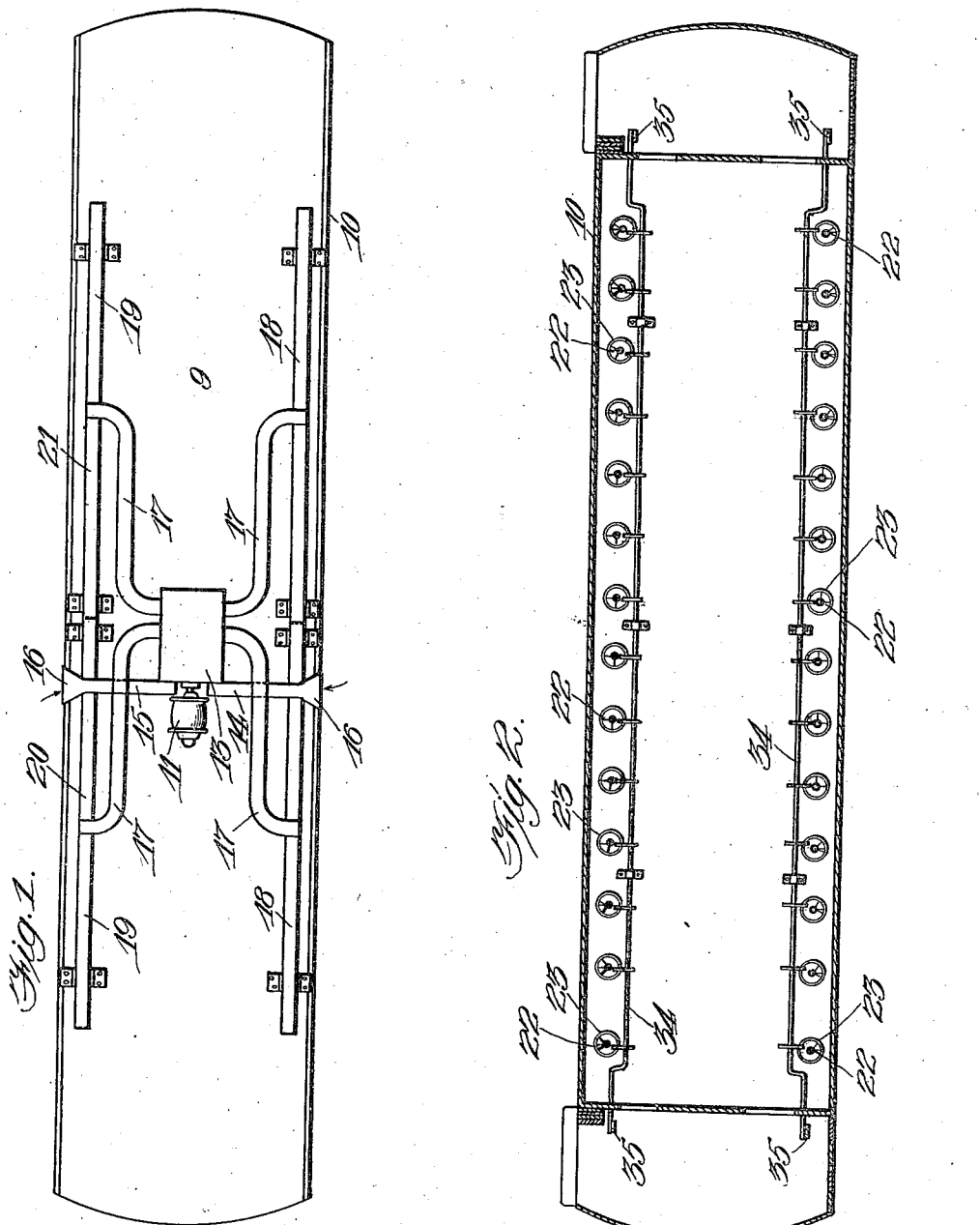

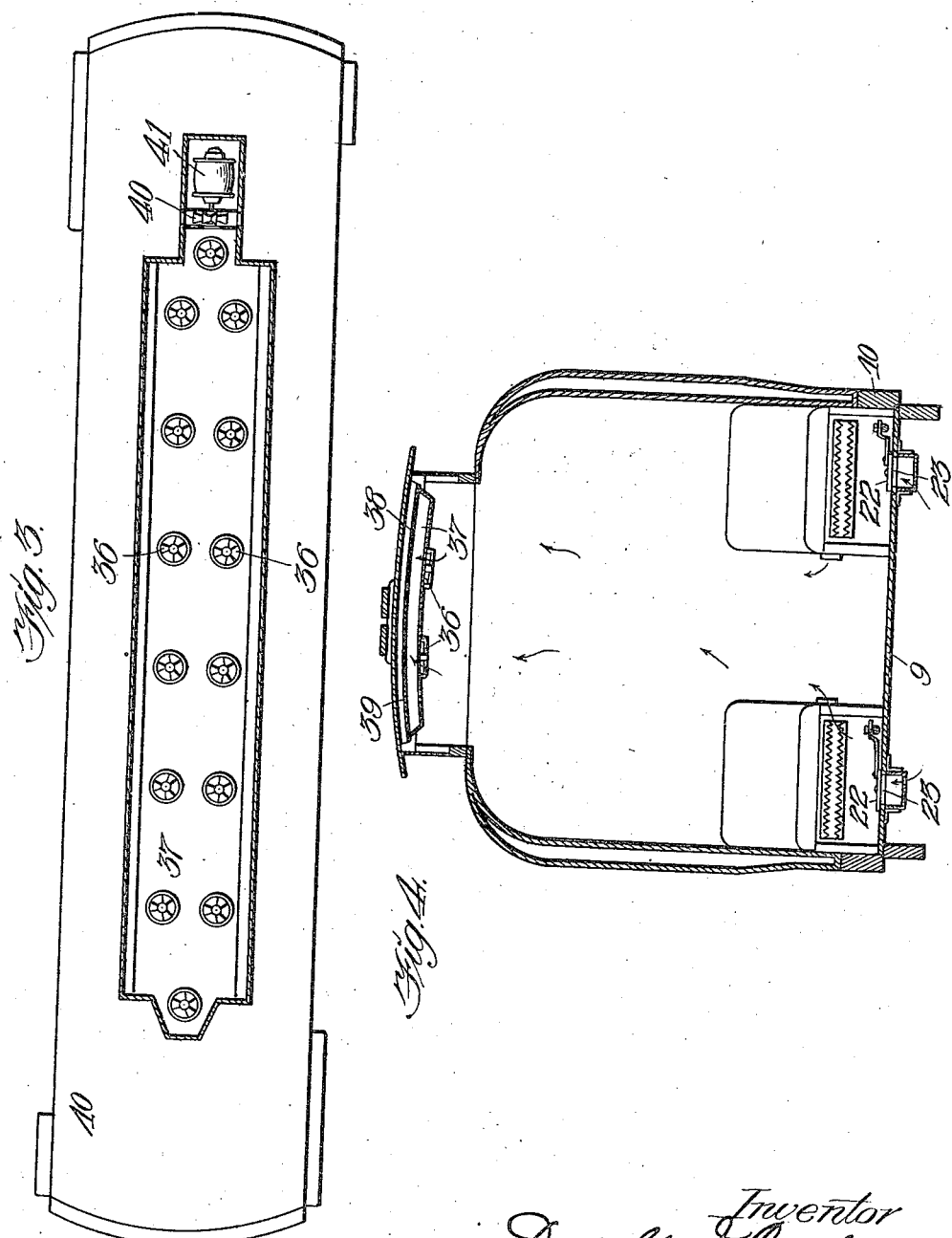

UNITED STATES PATENT OFFICE.

DWIGHT I. COOKE, OF CHICAGO, ILLINOIS, ASSIGNOR TO VACUUM CAR VENTILATING COMPANY, OF CHICAGO, ILLINOIS, A CORPORATION OF ILLINOIS.

CAR-VENTILATING SYSTEM.

1,024,438.  Specification of Letters Patent.  Patented Apr. 23, 1912.

Application filed October 19, 1909. Serial No. 523,455.

*To all whom it may concern:*

Be it known that I, DWIGHT I. COOKE, a citizen of the United States, residing at Chicago, in the county of Cook and State of Illinois, have invented certain new and useful Improvements in Car-Ventilating Systems, of which the following is a specification.

This invention relates to that class of car ventilating systems in which the air is forced into the car at the bottom, and after circulating through the car is drawn out at the top. Such a system is generally termed a pressure system, and is adapted to be applied to passenger cars generally, but is especially adapted for use with surface electric cars of the "pay-as-you-enter" or other well known types.

The objects of the present invention are, to construct a system that will always be under the control of the car crew; that will cause an even distribution of air throughout the car body; that will produce an even steady flow of air from the bottom toward the top of the car, at a speed below that which will cause a draft; that will operate while the car is standing still; and that will have its parts positioned so as to in no way interfere with the construction, operation, or appearance of the car.

The invention consists in the features of construction and combination of parts hereinafter described and claimed.

In the drawings, Figure 1 is a bottom view of a car body, having the trucks, etc., removed, and showing the air intakes on the outside of the car, and conduits or ducts through which the air is conducted to the interior of the car; Fig. 2, a sectional plan view of the interior of a car body, with the seats removed, showing the air intakes entering the interior of the car, and means for controlling the same; Fig. 3, a longitudinal section showing the air ducts at the ceiling of the car, and means for controlling the same; Fig. 4, a cross section through the car body; Fig. 5, a detail cross section through the air intakes; Fig. 6, a detail of a register face as used in the center of a car body; Fig. 7, a similar view, showing a register face as used at the ends of the car; and Fig. 8, a sectional detail through the casing surrounding the fan at the air intake.

Located on the bottom 9 of a car body 10 is a motor 11, which actuates a fan 12 located near the forward end of a casing 13. Entering at the front of said casing are air intake ducts 14 and 15, which extend crosswise of the car body and terminate at the outer edge thereof. The intake ducts are preferably flared as at 16 in order to receive a greater volume of air, and would in practice be equipped with screens or other filtering substances to prevent the ingress of dust.

Extending out from the side walls at a point toward the rear of the casing 13 are ducts 17, which communicate with ducts 18 and 19 located on opposite sides of the car body and extending longitudinally thereof. These ducts communicate with suitable openings extending into the interior of the car body. The ducts 18 and 19 are each preferably constructed in two sections, 20 and 21, the ducts 17 leading into a point approximately at the center of each section. This is to eliminate in a great degree the loss of vitality in the air while passing from the center to the extremities of the ducts 18 and 19, which loss would be manifest were the ducts made in one section extending the length of the car body, with a single supply duct entering at the middle thereof. In the present construction, the air, after entering the ducts, will only have to travel one-half the distance to reach the extremity of the longitudinally extending ducts that it would travel were the longitudinally extending ducts continuous and the supply ducts entered at the center thereof. This, of course, results in a loss of but half as much velocity and volume of air—the air entering the car at the extremities of the duct having as much vitality as the air entering at the center.

The air enters the car through openings 22, preferably located at a point underneath the heater, so that the air will circulate through the heater and become tempered before it reaches the passenger and will not reduce the temperature of the interior of the car. Located in the openings 22 are circular plates 23 attached to the floor of the car, and having formed therein a segmental opening 24; and said plates are formed with an upturned flange 25 which serves to retain a movable plate 26, pivoted on a pin 27 and having a segmental opening 28 adapted to register with the opening 24 of the fixed plate 23, the movable and fixed plates constituting a register face. The movable plate 26 has a radially extending slot 29 formed therein, which receives a pin 30 formed on an arm 31, which arm has a longitudinally extending slot 32 formed therein, into which is entered a set screw 33 screw-threaded into the body portion of an actuating rod 34, which rod extends the length of the car and terminates at a suitable point in the vestibules thereof. To the ends of the rod 34 are affixed actuating levers 35, by means of which the trainmen can move the rod 34 back and forth, opening and closing the ventilators. The arm 31 is held against swinging at either end and is capable only of a backward and forward movement in unison with the movement of the rod 34.

It will be seen from the above description that by adjusting the arm 31, so as to have the pin 30 lie a greater or less distance from the axial center of the plate 26, a movement of the rod 34 will cause the plate 26 to swing a greater or less distance and thus uncover the opening 25 in the fixed plate 23 to a greater or less degree and permit a small or large volume of air to enter the car. At the points adjacent to the end of the car, the arm 31 is positioned, as shown in Fig. 7; that is, with the pin 30 near the edge of the plate 26, so that a movement of the lever 34 will actuate the arm 31 to move the plate 26 a distance to expose but a portion of the opening 24, while at the center of the car the pin is positioned, as shown in Fig. 6; that is, adjacent to the axial center of the plate 26, so that a movement of the lever 34 will cause a movement of the arm 31 that will move the plate 26 a distance sufficient to fully expose the opening 24. The arms attached to the plates lying intermediate of the extremity and center of the car body will be adjusted so as to gradually decrease the amount of opening shown in Fig. 6 to that shown in Fig. 7. Thus, at the ends of the car where air is entering the doors, the amount of air supplied by the ventilators is reduced in comparison with that supplied by the ventilators at the center of the car, where the air from the door does not penetrate. This will result in an even distribution of air over the entire interior of the car body and will not permit a circulation of air at any one point of the car that will exceed the velocity which constitutes a draft.

Located in the ceiling of the car are a number of exhaust ports 36 controlled by suitable means, which ports lead into a chamber 37 formed by the ceiling 38 and a partition 39 running the length of the car body and located intermediate the ceiling and roof of the car. The location of this chamber is such that it does not in any way interfere with the opening and closing of the ventilator deck sash windows; and located at one end of this chamber is a fan 40 actuated by a motor 41. The wires supplying the current to the motors 11 and 41 pass through suitable controlling means located in the vestibule, so that the speed of the motors can be regulated by any of the trainmen.

The operation will be understood from the foregoing, but briefly is as follows: Air is drawn through the ducts 14 and 15 into the casing 13 by the fan 12. From the casing 13 it passes into the duct 17 and thence to the ducts 18 and 19, where it enters the interior of the car. The air, after passing through the heaters, circulates through the car and is drawn out through the ports 36 by means of the fan 40. In order that the air may not be drawn too quickly through the car and thus cause draft, I prefer to have the fan 40 driven at a reduced speed from the fan 12, the fan 40 merely serving as a means for obtaining an increased circulation, as circulation might be obtained by making intakes in the floor large enough to supply sufficient air to force the dead air to the roof, where it would be drawn out by the movement of the car.

I claim:

1. In a car ventilating system, the combination of a car body having openings in the floor thereof for the admission of air, means for forcing air through said openings, registers composed of fixed and movable sections for regulating the flow of air through said openings, rods extending parallel with said registers and terminating in vestibules of the car, an actuating lever attached to each of the ends of said rods, arms extending from the movable sections of each of the registers and connected to said rods, means for securing an independent adjustment of each of said arms toward and from the axial center of said movable sections, thus regulating their movements and admitting a relatively large or small volume of air, and means located at the top of said car body for exhausting the air, substantially as described.

2. In a car ventilating system, the combination of a car body having openings in the floor thereof for the admission of air, means for forcing air through said openings, registers composed of fixed and movable sections for regulating the flow of air through said openings, rods extending parallel with said registers and terminating in the vestibules of the car, an actuating lever attached at each of the ends of said rods, arms extending from the movable sections of the registers and connected to said rods, the movable sections having radially extending slots formed therein adapted to receive a square pin on said arm, the arms having longitudinally extending slots through which is inserted a set screw threaded into the body portion of the rod, and means located at the top of the car body for exhausting the air, substantially as described.

DWIGHT I. COOKE.

Witnesses:
WALKER BANNING,
WM. P. BOND.